(12) United States Patent
Blakeley et al.

(10) Patent No.: US 12,670,001 B2
(45) Date of Patent: Jun. 30, 2026

(54) WORLD-CONTROLLED AND APPLICATION-CONTROLLED AUGMENTS IN AN ARTIFICIAL-REALITY ENVIRONMENT

(71) Applicant: Meta Platforms Technologies, LLC, Menlo Park, CA (US)

(72) Inventors: John Jacob Blakeley, Bothell, WA (US); Michal Hlavac, Seattle, WA (US); Pol Pla I Conesa, Portland, OR (US); Michael Ishigaki, Mountain View, CA (US); Jonathan Michael Proto, San Francisco, CA (US); Paul Mealy, Bellevue, WA (US); Kevin Harper, Redmond, WA (US); Jenny Kam, Seattle, WA (US); Jossie E. Tirado Arroyo, Kenmore, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 26 days.

(21) Appl. No.: 18/636,891

(22) Filed: Apr. 16, 2024

(65) Prior Publication Data

US 2024/0264851 A1 Aug. 8, 2024

Related U.S. Application Data

(63) Continuation of application No. 17/740,570, filed on May 10, 2022, now Pat. No. 12,026,527.

(51) Int. Cl.
*G06F 9/451* (2018.01)
*G06F 3/0484* (2022.01)
*G06T 11/00* (2006.01)

(52) U.S. Cl.
CPC ............ *G06F 9/451* (2018.02); *G06F 3/0484* (2013.01); *G06T 11/00* (2013.01)

(58) Field of Classification Search
CPC ......... G06F 9/451; G06F 3/0484; G06T 11/00
(Continued)

(56) References Cited

U.S. PATENT DOCUMENTS 770,149 A 9/1904 Bailey
6,748,420 B1 6/2004 Quatrano et al.
(Continued)

FOREIGN PATENT DOCUMENTS

CN 108564427 A 9/2018
CN 112034977 A 12/2020
(Continued)

OTHER PUBLICATIONS

European Search Report for European Patent Application No. 24155099.5, dated Aug. 5, 2024, 7 pages.
(Continued)

*Primary Examiner* — Jin Ge
(74) *Attorney, Agent, or Firm* — Morgan, Lewis & Bockius LLP

(57) ABSTRACT

The present disclosure provides world-controlled augments and application-controlled augments. World-controlled augments can be controlled directly by a shell in the artificial reality environment. To allow even inexperienced users to develop world-controlled augments, a world-controlled builder system is provided. Application-controlled augments may be resource intensive (e.g., using eye-tracking, social-media tie-ins, etc.), may support complicated interactions among themselves, may require or have extensive use of inputs and permissioned resources, and are controlled by their hosting application. When a running application is halted, the application closes its application-controlled augments but can choose to have the XR system run a "place-holder" world-controlled augment for as long as the application is not running. The place-holder world-controlled
(Continued)

augment preserves the appearance of the application in the artificial reality environment but uses few system resources. Upon a user selecting a place-holder world-controlled augment, the XR system can run the associated application and close the place-holder world-controlled augment.

17 Claims, 12 Drawing Sheets

(58) Field of Classification Search
USPC .......................................................... 345/633
See application file for complete search history.

(56) References Cited

U.S. PATENT DOCUMENTS

| | | | |
|---|---|---|---|
| 6,842,175 | B1 | 1/2005 | Schmalstieg et al. |
| 6,842,877 | B2 | 1/2005 | Robarts et al. |
| 7,395,534 | B2 | 7/2008 | Alcazar et al. |
| 7,650,575 | B2 | 1/2010 | Cummins et al. |
| 7,701,439 | B2 | 4/2010 | Hillis et al. |
| 8,335,991 | B2 | 12/2012 | Douceur et al. |
| 8,368,640 | B2 | 2/2013 | Dardinski et al. |
| 8,558,759 | B1 | 10/2013 | Prada Gomez et al. |
| 8,726,233 | B1 | 5/2014 | Raghavan |
| 8,930,940 | B2 | 1/2015 | Xu et al. |
| 8,947,351 | B1 | 2/2015 | Noble |
| 8,947,427 | B2 | 2/2015 | Shuster et al. |
| 9,055,404 | B2 | 6/2015 | Setlur et al. |
| 9,081,177 | B2 | 7/2015 | Wong et al. |
| 9,117,274 | B2 | 8/2015 | Liao et al. |
| 9,129,404 | B1 | 9/2015 | Wagner |
| 9,292,089 | B1 | 3/2016 | Sadek |
| 9,424,239 | B2 | 8/2016 | Dunn et al. |
| 9,443,353 | B2 | 9/2016 | Vaddadi et al. |
| 9,477,368 | B1 | 10/2016 | Filip et al. |
| 9,478,030 | B1 | 10/2016 | Lecky |
| 9,530,252 | B2 | 12/2016 | Poulos et al. |
| 9,607,422 | B1 | 3/2017 | Leedom |
| 9,658,737 | B2 | 5/2017 | Rothenberger et al. |
| 9,817,472 | B2 | 11/2017 | Lee et al. |
| 9,870,716 | B1 | 1/2018 | Rao et al. |
| 9,922,462 | B2 | 3/2018 | Miller |
| 10,013,625 | B1 | 7/2018 | Ahammad et al. |
| 10,015,503 | B1 | 7/2018 | Ahammad |
| 10,220,303 | B1 | 3/2019 | Schmidt et al. |
| 10,248,284 | B2 | 4/2019 | Itani et al. |
| 10,319,154 | B1 | 6/2019 | Chakravarthula et al. |
| 10,335,572 | B1 | 7/2019 | Kumar |
| 10,402,647 | B2 | 9/2019 | Schuh |
| 10,473,935 | B1 | 11/2019 | Gribetz et al. |
| 10,521,944 | B2 | 12/2019 | Sareen et al. |
| 10,551,993 | B1 | 2/2020 | Sanocki et al. |
| 10,715,851 | B1 | 7/2020 | Shankar et al. |
| 10,783,714 | B2 | 9/2020 | Diament et al. |
| 10,799,792 | B2 | 10/2020 | Rios |
| 10,803,663 | B2 | 10/2020 | Wang et al. |
| 10,803,862 | B2 | 10/2020 | Jang et al. |
| 10,841,292 | B2 | 11/2020 | Soon-Shiong |
| 10,902,679 | B2 | 1/2021 | Molyneaux et al. |
| 10,909,762 | B2 | 2/2021 | Karalis et al. |
| 10,950,034 | B1 | 3/2021 | Garcia et al. |
| 10,963,144 | B2 | 3/2021 | Fox et al. |
| 10,996,915 | B2 | 5/2021 | Kim |
| 11,009,716 | B2 | 5/2021 | Kiemele et al. |
| 11,017,609 | B1 | 5/2021 | Buzzerio et al. |
| 11,064,047 | B1 | 7/2021 | Stegall et al. |
| 11,068,393 | B2 | 7/2021 | Mandaleeka |
| 11,100,812 | B2 | 8/2021 | Daniel et al. |
| 11,113,893 | B1 | 9/2021 | Ma et al. |
| 11,126,320 | B1 | 9/2021 | Thompson et al. |
| 11,132,052 | B2 | 9/2021 | Baumbach et al. |
| 11,170,576 | B2 | 11/2021 | Ravasz et al. |
| 11,176,755 | B1 | 11/2021 | Tichenor et al. |
| 11,178,376 | B1 * | 11/2021 | Tichenor ............ G02B 27/0172 |
| 11,216,152 | B2 | 1/2022 | Alexander |
| 11,227,445 | B1 | 1/2022 | Tichenor et al. |
| 11,238,664 | B1 | 2/2022 | Tavakoli et al. |
| 11,256,341 | B1 | 2/2022 | Kin et al. |
| 11,270,513 | B2 | 3/2022 | Yerli |
| 11,270,522 | B1 | 3/2022 | Tauber et al. |
| 11,307,647 | B2 | 4/2022 | Bond et al. |
| 11,409,405 | B1 | 8/2022 | Hlavac et al. |
| 11,417,054 | B1 | 8/2022 | Tanner et al. |
| 11,433,304 | B2 | 9/2022 | Fish et al. |
| 11,467,656 | B2 | 10/2022 | Spivack |
| 11,521,361 | B1 | 12/2022 | Taguchi et al. |
| 11,593,997 | B2 | 2/2023 | Smith et al. |
| 11,636,655 | B2 | 4/2023 | Ma et al. |
| 11,651,573 | B2 | 5/2023 | Tichenor et al. |
| 11,676,348 | B2 | 6/2023 | Simpson et al. |
| 11,720,167 | B2 | 8/2023 | Bond et al. |
| 11,748,944 | B2 | 9/2023 | Karadayi et al. |
| 11,762,952 | B2 | 9/2023 | Hlavac et al. |
| 11,769,304 | B2 | 9/2023 | Tichenor et al. |
| 11,798,247 | B2 | 10/2023 | Karadayi et al. |
| 11,847,753 | B2 | 12/2023 | Tichenor et al. |
| 11,928,308 | B2 | 3/2024 | Hlavac et al. |
| 11,935,208 | B2 | 3/2024 | Karadayi et al. |
| 12,130,998 | B1 | 10/2024 | Roben |
| 12,197,634 | B2 | 1/2025 | Bond et al. |
| 2003/0038805 | A1 | 2/2003 | Wong et al. |
| 2003/0106063 | A1 | 6/2003 | Guedalia |
| 2004/0237082 | A1 | 11/2004 | Alcazar et al. |
| 2005/0018216 | A1 | 1/2005 | Barsness et al. |
| 2008/0089587 | A1 | 4/2008 | Kim et al. |
| 2008/0092111 | A1 | 4/2008 | Kinnucan et al. |
| 2009/0006937 | A1 | 1/2009 | Knapp et al. |
| 2009/0063381 | A1 | 3/2009 | Chan et al. |
| 2009/0106234 | A1 | 4/2009 | Siedlecki et al. |
| 2009/0164913 | A1 | 6/2009 | Davar et al. |
| 2009/0199128 | A1 | 8/2009 | Matthews et al. |
| 2009/0307623 | A1 | 12/2009 | Agarawala et al. |
| 2009/0313299 | A1 | 12/2009 | Bonev et al. |
| 2010/0251177 | A1 | 9/2010 | Geppert et al. |
| 2010/0306716 | A1 | 12/2010 | Perez |
| 2011/0185043 | A1 | 7/2011 | Zeller et al. |
| 2011/0267265 | A1 | 11/2011 | Stinson |
| 2012/0069168 | A1 | 3/2012 | Huang et al. |
| 2012/0143358 | A1 | 6/2012 | Adams et al. |
| 2012/0188279 | A1 | 7/2012 | Demaine |
| 2012/0206345 | A1 | 8/2012 | Langridge |
| 2012/0218301 | A1 | 8/2012 | Miller |
| 2012/0249741 | A1 | 10/2012 | Maciocci et al. |
| 2012/0275686 | A1 | 11/2012 | Wilson et al. |
| 2012/0293544 | A1 | 11/2012 | Miyamoto et al. |
| 2013/0051615 | A1 | 2/2013 | Lim et al. |
| 2013/0063345 | A1 | 3/2013 | Maeda |
| 2013/0069860 | A1 | 3/2013 | Davidson |
| 2013/0076788 | A1 | 3/2013 | Ben Zvi |
| 2013/0083173 | A1 | 4/2013 | Geisner et al. |
| 2013/0117688 | A1 | 5/2013 | Yerli |
| 2013/0125066 | A1 | 5/2013 | Klein et al. |
| 2013/0141419 | A1 | 6/2013 | Mount et al. |
| 2013/0147793 | A1 | 6/2013 | Jeon et al. |
| 2013/0169682 | A1 | 7/2013 | Novak et al. |
| 2013/0254884 | A1 | 9/2013 | Dalcher et al. |
| 2013/0265220 | A1 | 10/2013 | Fleischmann et al. |
| 2013/0293468 | A1 | 11/2013 | Perez et al. |
| 2013/0336629 | A1 | 12/2013 | Mulholland et al. |
| 2014/0075370 | A1 | 3/2014 | Guerin et al. |
| 2014/0114845 | A1 | 4/2014 | Rogers et al. |
| 2014/0125598 | A1 | 5/2014 | Cheng et al. |
| 2014/0149901 | A1 | 5/2014 | Hunter |
| 2014/0225922 | A1 | 8/2014 | Sbardella |
| 2014/0236996 | A1 | 8/2014 | Masuko et al. |
| 2014/0270494 | A1 | 9/2014 | Sawhney et al. |
| 2014/0357366 | A1 | 12/2014 | Koganezawa et al. |
| 2014/0375683 | A1 | 12/2014 | Salter et al. |
| 2014/0375691 | A1 | 12/2014 | Kasahara |
| 2015/0015504 | A1 | 1/2015 | Lee et al. |
| 2015/0035746 | A1 | 2/2015 | Cockburn et al. |
| 2015/0054742 | A1 | 2/2015 | Imoto et al. |
| 2015/0062160 | A1 | 3/2015 | Sakamoto et al. |

(56) References Cited

U.S. PATENT DOCUMENTS

| | | |
|---|---|---|
| 2015/0074506 A1 | 3/2015 | Dunn et al. |
| 2015/0074742 A1 | 3/2015 | Kohno et al. |
| 2015/0077592 A1 | 3/2015 | Fahey |
| 2015/0123966 A1 | 5/2015 | Newman |
| 2015/0143302 A1 | 5/2015 | Chang et al. |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0181679 A1 | 6/2015 | Liao et al. |
| 2015/0206321 A1 | 7/2015 | Scavezze et al. |
| 2015/0213371 A1 | 7/2015 | Nitz et al. |
| 2015/0220150 A1 | 8/2015 | Plagemann et al. |
| 2015/0243079 A1 | 8/2015 | Cho et al. |
| 2015/0253862 A1 | 9/2015 | Seo et al. |
| 2015/0261659 A1 | 9/2015 | Bader et al. |
| 2015/0269780 A1 | 9/2015 | Herman et al. |
| 2015/0302662 A1 | 10/2015 | Miller |
| 2015/0356774 A1 | 12/2015 | Gal et al. |
| 2016/0026253 A1 | 1/2016 | Bradski et al. |
| 2016/0063762 A1 | 3/2016 | Heuvel et al. |
| 2016/0110052 A1 | 4/2016 | Kim et al. |
| 2016/0133170 A1 | 5/2016 | Fateh |
| 2016/0147308 A1 | 5/2016 | Gelman et al. |
| 2016/0147408 A1 | 5/2016 | Bevis et al. |
| 2016/0170603 A1 | 6/2016 | Bastien et al. |
| 2016/0180590 A1 | 6/2016 | Kamhi et al. |
| 2016/0189368 A1 | 6/2016 | Shindo |
| 2016/0189386 A1 | 6/2016 | Michaelraj et al. |
| 2016/0260261 A1 | 9/2016 | Hsu |
| 2016/0378291 A1 | 12/2016 | Pokrzywka |
| 2017/0041388 A1 | 2/2017 | Tal et al. |
| 2017/0060230 A1 | 3/2017 | Faaborg et al. |
| 2017/0069134 A1 | 3/2017 | Shapira et al. |
| 2017/0075420 A1 | 3/2017 | Yu et al. |
| 2017/0076500 A1 | 3/2017 | Maggiore et al. |
| 2017/0084051 A1 | 3/2017 | Weising et al. |
| 2017/0099295 A1 | 4/2017 | Ricci |
| 2017/0109936 A1 | 4/2017 | Powderly et al. |
| 2017/0124230 A1 | 5/2017 | Liu et al. |
| 2017/0139478 A1 | 5/2017 | Jeon et al. |
| 2017/0192513 A1 | 7/2017 | Karmon et al. |
| 2017/0237789 A1 | 8/2017 | Harner et al. |
| 2017/0242675 A1 | 8/2017 | Deshmukh |
| 2017/0243465 A1 | 8/2017 | Bourne, Jr. et al. |
| 2017/0258526 A1 | 9/2017 | Lang |
| 2017/0262063 A1 | 9/2017 | Blénessy et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0311129 A1 | 10/2017 | Lopez-Uricoechea et al. |
| 2017/0323488 A1 | 11/2017 | Mott et al. |
| 2017/0364198 A1 | 12/2017 | Yoganandan et al. |
| 2017/0372225 A1 | 12/2017 | Foresti |
| 2018/0005429 A1 | 1/2018 | Osman et al. |
| 2018/0007099 A1 | 1/2018 | Ein-Gil et al. |
| 2018/0046498 A1* | 2/2018 | Park .................... G06F 9/4843 |
| 2018/0059901 A1 | 3/2018 | Gullicksen |
| 2018/0082480 A1 | 3/2018 | White et al. |
| 2018/0095616 A1 | 4/2018 | Valdivia et al. |
| 2018/0095635 A1 | 4/2018 | Valdivia et al. |
| 2018/0095636 A1 | 4/2018 | Valdivia et al. |
| 2018/0096507 A1 | 4/2018 | Valdivia et al. |
| 2018/0096519 A1 | 4/2018 | Tokubo |
| 2018/0098059 A1 | 4/2018 | Valdivia et al. |
| 2018/0107278 A1 | 4/2018 | Goel et al. |
| 2018/0113599 A1 | 4/2018 | Yin |
| 2018/0121065 A1* | 5/2018 | Seo ......................... G06F 9/451 |
| 2018/0158134 A1 | 6/2018 | Hassan |
| 2018/0189568 A1 | 7/2018 | Powderly et al. |
| 2018/0189647 A1 | 7/2018 | Calvo et al. |
| 2018/0300557 A1 | 10/2018 | Rodenas et al. |
| 2018/0307303 A1 | 10/2018 | Powderly et al. |
| 2018/0314484 A1 | 11/2018 | Pahud et al. |
| 2018/0315162 A1 | 11/2018 | Sturm et al. |
| 2018/0322701 A1 | 11/2018 | Pahud et al. |
| 2018/0323972 A1 | 11/2018 | Reed et al. |
| 2018/0335925 A1 | 11/2018 | Hsiao et al. |
| 2018/0350144 A1 | 12/2018 | Rathod |
| 2018/0357780 A1 | 12/2018 | Young et al. |
| 2018/0365897 A1 | 12/2018 | Pahud et al. |
| 2019/0005724 A1 | 1/2019 | Pahud et al. |
| 2019/0018498 A1 | 1/2019 | West et al. |
| 2019/0043259 A1 | 2/2019 | Wang et al. |
| 2019/0094981 A1 | 3/2019 | Bradski et al. |
| 2019/0096131 A1 | 3/2019 | Crews et al. |
| 2019/0107894 A1 | 4/2019 | Hebbalaguppe et al. |
| 2019/0107991 A1 | 4/2019 | Spivack et al. |
| 2019/0108578 A1 | 4/2019 | Spivack et al. |
| 2019/0108682 A1 | 4/2019 | Spivack et al. |
| 2019/0114061 A1 | 4/2019 | Daniels et al. |
| 2019/0130656 A1 | 5/2019 | Gebbie et al. |
| 2019/0130788 A1 | 5/2019 | Seaton |
| 2019/0155481 A1 | 5/2019 | DiVerdi et al. |
| 2019/0163700 A1 | 5/2019 | Baumgardner et al. |
| 2019/0172262 A1 | 6/2019 | McHugh et al. |
| 2019/0197785 A1 | 6/2019 | Tate-Gans et al. |
| 2019/0212827 A1 | 7/2019 | Kin et al. |
| 2019/0213792 A1 | 7/2019 | Jakubzak et al. |
| 2019/0221035 A1 | 7/2019 | Clark et al. |
| 2019/0235729 A1 | 8/2019 | Day et al. |
| 2019/0237044 A1 | 8/2019 | Day et al. |
| 2019/0258318 A1 | 8/2019 | Qin et al. |
| 2019/0278376 A1 | 9/2019 | Kutliroff et al. |
| 2019/0278432 A1 | 9/2019 | Bennett et al. |
| 2019/0279424 A1 | 9/2019 | Clausen et al. |
| 2019/0279426 A1 | 9/2019 | Musunuri et al. |
| 2019/0286231 A1 | 9/2019 | Burns et al. |
| 2019/0294721 A1 | 9/2019 | Keifer et al. |
| 2019/0294889 A1 | 9/2019 | Sriram et al. |
| 2019/0340799 A1 | 11/2019 | Dryer et al. |
| 2019/0340833 A1 | 11/2019 | Furtwangler et al. |
| 2019/0362562 A1 | 11/2019 | Benson |
| 2019/0369391 A1 | 12/2019 | Cordesses et al. |
| 2019/0371060 A1 | 12/2019 | Energin et al. |
| 2019/0371279 A1 | 12/2019 | Mak |
| 2019/0377406 A1 | 12/2019 | Steptoe et al. |
| 2019/0377416 A1 | 12/2019 | Alexander |
| 2019/0377487 A1 | 12/2019 | Bailey et al. |
| 2019/0377538 A1 | 12/2019 | Jones et al. |
| 2019/0385371 A1 | 12/2019 | Joyce et al. |
| 2020/0013211 A1 | 1/2020 | Bergen et al. |
| 2020/0042108 A1 | 2/2020 | Wan |
| 2020/0065584 A1 | 2/2020 | Iyer et al. |
| 2020/0066047 A1 | 2/2020 | Karalis et al. |
| 2020/0082629 A1 | 3/2020 | Jones et al. |
| 2020/0097077 A1 | 3/2020 | Nguyen et al. |
| 2020/0097091 A1 | 3/2020 | Chou et al. |
| 2020/0111256 A1 | 4/2020 | Bleyer et al. |
| 2020/0151965 A1 | 5/2020 | Forbes et al. |
| 2020/0218423 A1 | 7/2020 | Ohashi |
| 2020/0219319 A1 | 7/2020 | Lashmar et al. |
| 2020/0225495 A1 | 7/2020 | Kiemele et al. |
| 2020/0225736 A1 | 7/2020 | Schwarz et al. |
| 2020/0225758 A1 | 7/2020 | Tang et al. |
| 2020/0226814 A1 | 7/2020 | Tang et al. |
| 2020/0226823 A1 | 7/2020 | Stachniak et al. |
| 2020/0241300 A1 | 7/2020 | Robinson et al. |
| 2020/0242842 A1 | 7/2020 | Fukazawa et al. |
| 2020/0279386 A1 | 9/2020 | Da Veiga |
| 2020/0279429 A1 | 9/2020 | Upadhyay et al. |
| 2020/0285761 A1 | 9/2020 | Buck et al. |
| 2020/0289934 A1 | 9/2020 | Azmandian et al. |
| 2020/0312028 A1 | 10/2020 | Charvat et al. |
| 2020/0334908 A1 | 10/2020 | Wilson et al. |
| 2020/0342673 A1 | 10/2020 | Lohr et al. |
| 2020/0351273 A1 | 11/2020 | Thomas |
| 2020/0363924 A1 | 11/2020 | Flexman et al. |
| 2020/0363930 A1 | 11/2020 | Srinivasan et al. |
| 2020/0368616 A1 | 11/2020 | Delamont |
| 2020/0375666 A1 | 12/2020 | Murphy |
| 2020/0394935 A1 | 12/2020 | Ray et al. |
| 2020/0402320 A1 | 12/2020 | Crews et al. |
| 2021/0012113 A1 | 1/2021 | Petill et al. |
| 2021/0014408 A1 | 1/2021 | Timonen et al. |

(56) References Cited

U.S. PATENT DOCUMENTS

| 2021/0026441 | A1 | 1/2021 | Spivack |
| 2021/0096726 | A1 | 4/2021 | Faulkner et al. |
| 2021/0097768 | A1 | 4/2021 | Malia et al. |
| 2021/0103449 | A1 | 4/2021 | Terpstra et al. |
| 2021/0111890 | A1 | 4/2021 | Reed et al. |
| 2021/0124821 | A1 | 4/2021 | Spivak et al. |
| 2021/0125414 | A1 | 4/2021 | Berkebile |
| 2021/0126823 | A1 | 4/2021 | Poess et al. |
| 2021/0158594 | A1* | 5/2021 | Huang .................. H04N 5/2628 |
| 2021/0158608 | A1 | 5/2021 | Boggs et al. |
| 2021/0183114 | A1 | 6/2021 | Corson |
| 2021/0191600 | A1 | 6/2021 | Lemay et al. |
| 2021/0192856 | A1 | 6/2021 | Lee |
| 2021/0272375 | A1 | 9/2021 | Lashmar et al. |
| 2021/0295602 | A1 | 9/2021 | Scapel et al. |
| 2021/0306238 | A1 | 9/2021 | Cheng et al. |
| 2021/0322856 | A1 | 10/2021 | Virkar et al. |
| 2021/0373741 | A1 | 12/2021 | Agarawala et al. |
| 2021/0378768 | A1 | 12/2021 | Olson et al. |
| 2021/0390765 | A1 | 12/2021 | Laaksonen et al. |
| 2022/0038522 | A1 | 2/2022 | Goolkasian et al. |
| 2022/0068035 | A1* | 3/2022 | Tichenor ............... G06Q 50/01 |
| 2022/0084279 | A1 | 3/2022 | Lindmeier et al. |
| 2022/0091722 | A1 | 3/2022 | Faulkner et al. |
| 2022/0100265 | A1 | 3/2022 | Kies et al. |
| 2022/0100279 | A1 | 3/2022 | Lee et al. |
| 2022/0101612 | A1 | 3/2022 | Palangie et al. |
| 2022/0121344 | A1 | 4/2022 | Pastrana Vicente et al. |
| 2022/0122329 | A1* | 4/2022 | Tichenor ................. G06T 19/20 |
| 2022/0139052 | A1 | 5/2022 | Tavakoli et al. |
| 2022/0161422 | A1 | 5/2022 | Chen et al. |
| 2022/0211188 | A1 | 7/2022 | Daub et al. |
| 2022/0261088 | A1 | 8/2022 | Pinchon et al. |
| 2022/0276765 | A1 | 9/2022 | Hlavac et al. |
| 2022/0318035 | A1 | 10/2022 | Garstenauer et al. |
| 2022/0358715 | A1 | 11/2022 | Tanner et al. |
| 2022/0406021 | A1 | 12/2022 | LeBeau et al. |
| 2022/0414403 | A1 | 12/2022 | Hlavac et al. |
| 2023/0004943 | A1 | 1/2023 | Øhrn et al. |
| 2023/0016490 | A1 | 1/2023 | Berkebile |
| 2023/0022194 | A1 | 1/2023 | Soryal |
| 2023/0056976 | A1 | 2/2023 | Tanner et al. |
| 2023/0126837 | A1 | 4/2023 | Karadayi et al. |
| 2023/0127438 | A1 | 4/2023 | Karadayi et al. |
| 2023/0134355 | A1 | 5/2023 | Lansel et al. |
| 2023/0152851 | A1 | 5/2023 | Berliner et al. |
| 2023/0168737 | A1 | 6/2023 | Pratt et al. |
| 2023/0169737 | A1 | 6/2023 | Taguchi et al. |
| 2023/0196766 | A1 | 6/2023 | Pla I Conesa et al. |
| 2023/0215120 | A1 | 7/2023 | Ma et al. |
| 2023/0221797 | A1 | 7/2023 | Louie et al. |
| 2023/0244755 | A1 | 8/2023 | Hlavac et al. |
| 2023/0245386 | A1 | 8/2023 | Karadayi et al. |
| 2023/0260000 | A1 | 8/2023 | Belavy |
| 2023/0260233 | A1 | 8/2023 | Goncalves et al. |
| 2023/0290089 | A1 | 9/2023 | Simpson et al. |
| 2023/0367611 | A1 | 11/2023 | Blakeley et al. |
| 2023/0384859 | A1 | 11/2023 | Bond et al. |
| 2023/0410436 | A1 | 12/2023 | Beauchamp et al. |
| 2023/0419616 | A1 | 12/2023 | Dudovitch et al. |
| 2023/0419998 | A1 | 12/2023 | Nguyen et al. |
| 2024/0045495 | A1 | 2/2024 | Elhadad et al. |
| 2024/0061547 | A1 | 2/2024 | Fleizach et al. |
| 2024/0095699 | A1 | 3/2024 | Sinha et al. |
| 2024/0126406 | A1 | 4/2024 | Hlavac et al. |
| 2024/0153205 | A1 | 5/2024 | Huergo Wagner et al. |
| 2024/0233292 | A1 | 7/2024 | Tichenor et al. |
| 2024/0250955 | A1 | 7/2024 | Lebeau et al. |
| 2024/0288995 | A1 | 8/2024 | Short et al. |
| 2024/0310992 | A1 | 9/2024 | Wan et al. |
| 2024/0311498 | A1 | 9/2024 | Millberg et al. |
| 2024/0312143 | A1 | 9/2024 | Millberg et al. |
| 2024/0331278 | A1 | 10/2024 | Arora et al. |
| 2024/0331287 | A1 | 10/2024 | Karadayi et al. |
| 2024/0331312 | A1 | 10/2024 | Freeman et al. |
| 2024/0331320 | A1 | 10/2024 | Taguchi et al. |
| 2024/0338070 | A1 | 10/2024 | Tanner et al. |
| 2024/0361837 | A1 | 10/2024 | Louie et al. |
| 2024/0402869 | A1 | 12/2024 | Boesel et al. |
| 2025/0036431 | A1 | 1/2025 | Han et al. |
| 2025/0060812 | A1 | 2/2025 | Bond et al. |
| 2025/0166322 | A1 | 5/2025 | Simpson et al. |

FOREIGN PATENT DOCUMENTS

| CN | 112424870 | A | 2/2021 |
| CN | 118732838 | A | 10/2024 |
| CN | 111095165 | B | 11/2024 |
| EP | 2887322 | B1 | 2/2020 |
| EP | 4439247 | A1 | 10/2024 |
| EP | 4439248 | A1 | 10/2024 |
| JP | 2014515962 | A | 7/2014 |
| JP | 2016148968 | A | 8/2016 |
| JP | WO2014097706 | A1 | 1/2017 |
| JP | 2017536618 | A | 12/2017 |
| JP | 2019101743 | A | 6/2019 |
| JP | 2019527881 | A | 10/2019 |
| JP | 2022147265 | A | 10/2022 |
| WO | 2014097706 | A1 | 6/2014 |
| WO | 2015192117 | A1 | 12/2015 |
| WO | 2016041088 | A1 | 3/2016 |
| WO | 2018235371 | A1 | 12/2018 |
| WO | 2019143839 | A1 | 7/2019 |
| WO | 2020159302 | A1 | 8/2020 |
| WO | 2020226832 | A1 | 11/2020 |
| WO | 2021163373 | A1 | 8/2021 |
| WO | 2022055822 | A1 | 3/2022 |
| WO | 2024039666 | A1 | 2/2024 |
| WO | 2024086325 | A1 | 4/2024 |

OTHER PUBLICATIONS

European Search Report for European Patent Application No. 24155337.9, dated Jul. 2, 2024, 7 pages.

European Search Report for European Patent Application No. 24156842.7, dated Jun. 25, 2024, 6 pages.

International Preliminary Report on Patentability for International Application No. PCT/US2022/053780, mailed Jul. 4, 2024, 9 pages.

International Preliminary Report on Patentability for International Application No. PCT/US2022/054413, mailed Jul. 25, 2024, 9 pages.

Office Action mailed Jun. 25, 2024 for Japanese Patent Application No. 2021-577408, filed on Aug. 8, 2020, 4 pages.

Tatzgern M., et al., "Adaptive Information Density for Augmented Reality Displays," IEEE Virtual Reality Conference, Mar. 19-23, 2016, pp. 83-92.

Advisory Action mailed Oct. 13, 2021 for U.S. Appl. No. 16/567,563, filed Sep. 11, 2019, 3 pages.

"App Clips," Apple Developer, 2022, 4 pages, Retrieved from the Internet: URL: https://developer.apple.com/app-clips/.

Broitman A., "Learn and Do More with Lens in Google Images," Oct. 25, 2018, Retrieved from the Internet: URL: https://www.blog.google/products/search/learn-and-do-more-lens-google-images/, 4 pages.

Final Office Action mailed Aug. 5, 2021 for U.S. Appl. No. 16/567,563, filed Sep. 11, 2019, 11 Pages.

Fleury C., et al, "A Generic Model for Embedding Users' Physical Workspaces into Multi-Scale Collaborative Virtual Environments," 20th International Conference on Artificial Reality and Telexistence, Dec. 3, 2010, 8 pages.

"Google Play Instant," Retrieved on [Jan. 27, 2022], 2 pages, Retrieved from the Internet: URL: https://developer.android.com/topic/google-play-instant.

Hincapie-Ramos J.D., et al, "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.

International Preliminary Report on Patentability for International Application No. PCT/US2020/045538, mailed Mar. 24, 2022, 9 pages.

(56) References Cited

OTHER PUBLICATIONS

International Preliminary Report on Patentability for International Application No. PCT/US2021/044098, mailed Mar. 9, 2023, 18 pages.
International Preliminary Report on Patentability for International Application No. PCT/US2022/032288, mailed Jan. 11, 2024, 10 pages.
International Preliminary Report on Patentability for International Application No. PCT/US2022/033338, mailed Jan. 11, 2024, 11 pages.
International Preliminary Report on Patentability for International Application No. PCT/US2022/040484, mailed Feb. 29, 2024, 9 pages.
International Preliminary Report on Patentability for International Application No. PCT/US2022/045510, mailed May 10, 2024, 9 pages.
International Search Report and Written Opinion for International Application No. PCT/US2020/045538, mailed Oct. 23, 2020, 11 Pages.
International Search Report and Written Opinion for International Application No. PCT/US2020/051763, mailed Feb. 3, 2021, 11 Pages.
International Search Report and Written Opinion for International Application No. PCT/US2022/020292 mailed Aug. 17, 2022, 17 pages.
International Search Report and Written Opinion for International Application No. PCT/US2022/031840, mailed Sep. 13, 2022, 13 pages.
International Search Report and Written Opinion for International Application No. PCT/US2022/032288, mailed Sep. 16, 2022, 11 pages.
International Search Report and Written Opinion for International Application No. PCT/US2022/033338 mailed Sep. 6, 2022, 13 pages.
International Search Report and Written Opinion for International Application No. PCT/US2022/040484, mailed Nov. 25, 2022, 11 pages.
International Search Report and Written Opinion for International Application No. PCT/US2022/045510, mailed Jan. 19, 2023, 10 pages.
International Search Report and Written Opinion for International Application No. PCT/US2022/053780, mailed Mar. 20, 2023, 10 pages.
International Search Report and Written Opinion for International Application No. PCT/US2022/054413, mailed Jul. 7, 2023, 11 pages.
International Search Report and Written Opinion for International Application No. PCT/US2023/021312, mailed Aug. 24, 2023, 15 pages.
Invitation to Pay Additional Fees for International Application No. PCT/US2021/044098, Nov. 3, 2021, 15 pages.
Mayer S., et al, "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.
Melnick K., "Google Rolls out New AR Features for Its Lens APP," May 28, 2019, Retrieved from the Internet: URL: https://vrscout.com/news/new-ar-features-google-lens/ , 3 pages.
Non-Final Office Action mailed Dec. 8, 2022 for U.S. Appl. No. 17/659,431, filed Apr. 15, 2022, 12 pages.
Non-Final Office Action mailed Jan. 25, 2021 for U.S. Appl. No. 16/567,563, filed Sep. 11, 2019, 10 Pages.
Notice of Allowance mailed Dec. 21, 2021 for U.S. Appl. No. 16/567,563, filed Sep. 11, 2019, 6 pages.
Notice of Allowance mailed Mar. 21, 2023 for U.S. Appl. No. 17/659,431, filed Apr. 15, 2022, 5 pages.
Office Action mailed Aug. 21, 2023 for Chinese Application No. 202080054473.3, filed Aug. 8, 2020, 7 pages.
Office Action mailed Feb. 26, 2024 for European Patent Application No. 20761419.9, filed on Aug. 8, 2020, 7 pages.

Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.
Prosecution History of U.S. Appl. No. 16/567,563 dated Jan. 25, 2021, through Dec. 21, 2021, 52 pages.
Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.
Schweigert R., et al, "EyePointing: A Gaze-Based Selection Technique," Proceedings of Mensch and Computer, Hamburg, Germany, Sep. 8-11, 2019, pp. 719-723.
Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.
Vitzthum A., "SSIML/Behaviour: Designing Behaviour and Animation of Graphical Objects in Virtual Reality and Multimedia Applications," Proceedings of the Seventh IEEE International Symposium on Multimedia, Dec. 12, 2005, 9 pages.
Wikipedia: "Simultaneous Localization and Mapping," Jul. 25, 2017, 7 pages, Retrieved from the Internet: URL: https://en.wikipedia.org/w/index.php?title=Simultaneous_localization_and_mappingoldid=731478358 [Retrieved on Oct. 23, 2017].
Wikipedia, "Multiple-document Interface," May 8, 2022 [retrieved on Aug. 16, 2023], 5 pages, Retrieved from the Internet: URL: https://web.archive.org/web/20220508091934/https://en.wikipedia.org/wiki/Multipledocument_interface.
European Search Report for European Patent Application No. 24158455.6, dated Jun. 28, 2024, 6 pages.
International Preliminary Report on Patentability for International Application No. PCT/US2023/021312, mailed Nov. 21, 2024, 14 pages.
European Search Report for European Patent Application No. 24159313.6, dated May 21, 2024, 6 pages.
Final Office Action mailed Jun. 11, 2025 for U.S. Appl. No. 18/194,221, filed Mar. 31, 2023, 19 pages.
Non-Final Office Action mailed Aug. 8, 2025 for U.S. Appl. No. 18/738,681, filed Jun. 10, 2024, 15 pages.
Non-Final Office Action mailed May 22, 2025 for U.S. Appl. No. 18/183,597, filed Mar. 14, 2023, 23 pages.
Non-Final Office Action mailed Aug. 27, 2025 for U.S. Appl. No. 18/937,886, filed Nov. 5, 2024, 12 pages.
Non-Final Office Action mailed Jun. 30, 2025 for U.S. Appl. No. 18/183,607, filed Mar. 14, 2023, 19 pages.
Notice of Allowance mailed Jul. 16, 2025 for U.S. Appl. No. 18/194,207, filed Mar. 31, 2023, 16 pages.
Office Action mailed Mar. 4, 2025 for European Patent Application No. 22735726.6, filed on Jun. 1, 2022, 5 pages.
Office Action mailed Jul. 8, 2025 for Japanese Patent Application No. 2023-507458, filed on Jul. 31, 2021, 3 pages.
Office Action mailed Jun. 12, 2025 for Taiwan Application No. 111105638, filed Feb. 16, 2022, 8 pages.
Office Action mailed Mar. 13, 2025 for Korean Application No. 10-2022-7011363, filed Aug. 8, 2020, 12 pages.
Office Action mailed Sep. 16, 2025 for Japanese Patent Application No. 2023-545773, filed on Mar. 15, 2022, 5 pages.
Office Action mailed Mar. 18, 2025 for Japanese Application No. 2023-507458, filed on Jul. 31, 2021, 9 pages.
Office Action mailed Aug. 19, 2025 for Korean Application No. 10-2023-7007911, filed Jul. 31, 2021, 7 pages.
Office Action mailed Sep. 19, 2025 for European Patent Application No. 22740636.0, filed on Jun. 5, 2022, 8 pages.
Virtus Learning Hub., "How to Use Virtual Reality in Unreal Engine 5 | Beginner Tutorial," Jul. 15, 2022, 3 pages, Retrieved from the Internet URL: https://www.youtube.com/watch?v=DiGh6MxDFds.
Office Action mailed Apr. 21, 2026 for Chinese Application No. 202280022190.X, filed Mar. 15, 2022, 28 pages.
Office Action mailed Apr. 27, 2026 for Chinese Application No. CN202280046065.2, filed Dec. 27, 2023, 25 pages.

* cited by examiner

100

101
102
103 start

702 run a world-controlled augment and an application with its augments

704 receive user selection of the world-controlled augment

706 run an application associated with the selected world-controlled augment end

WORLD-CONTROLLED AND APPLICATION-CONTROLLED AUGMENTS IN AN ARTIFICIAL-REALITY ENVIRONMENT

CROSS-REFERENCE TO RELATED APPLICATIONS

This application is a continuation of U.S. application Ser. No. 17/740,570, filed May 10, 2022, titled "World-Controlled and Application-Controlled Augments in an Artificial-Reality Environment," currently pending and which is herein incorporated by reference in its entirety.

TECHNICAL FIELD

The present disclosure is directed to supporting multiple core types of augment virtual objects in an artificial-reality environment.

BACKGROUND

An "augment" in an artificial-reality (XR) environment is a virtual object that can include presentation data, context, and logic. An XR system can use augments as the fundamental building block for displaying 2D and 3D models in the artificial reality environment. For example, augments can represent people, places, and things in an artificial reality environment and can respond to a context such as a current display mode, time of day, a type of surface the augment is on, a relationship to other augments, etc.

An XR system provides the richest user experience when it supports both (i) augments with a broad range of capabilities and (ii) developers with a broad range of expertise. However, these requirements can conflict as broadly capable augments require significant expertise to develop.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
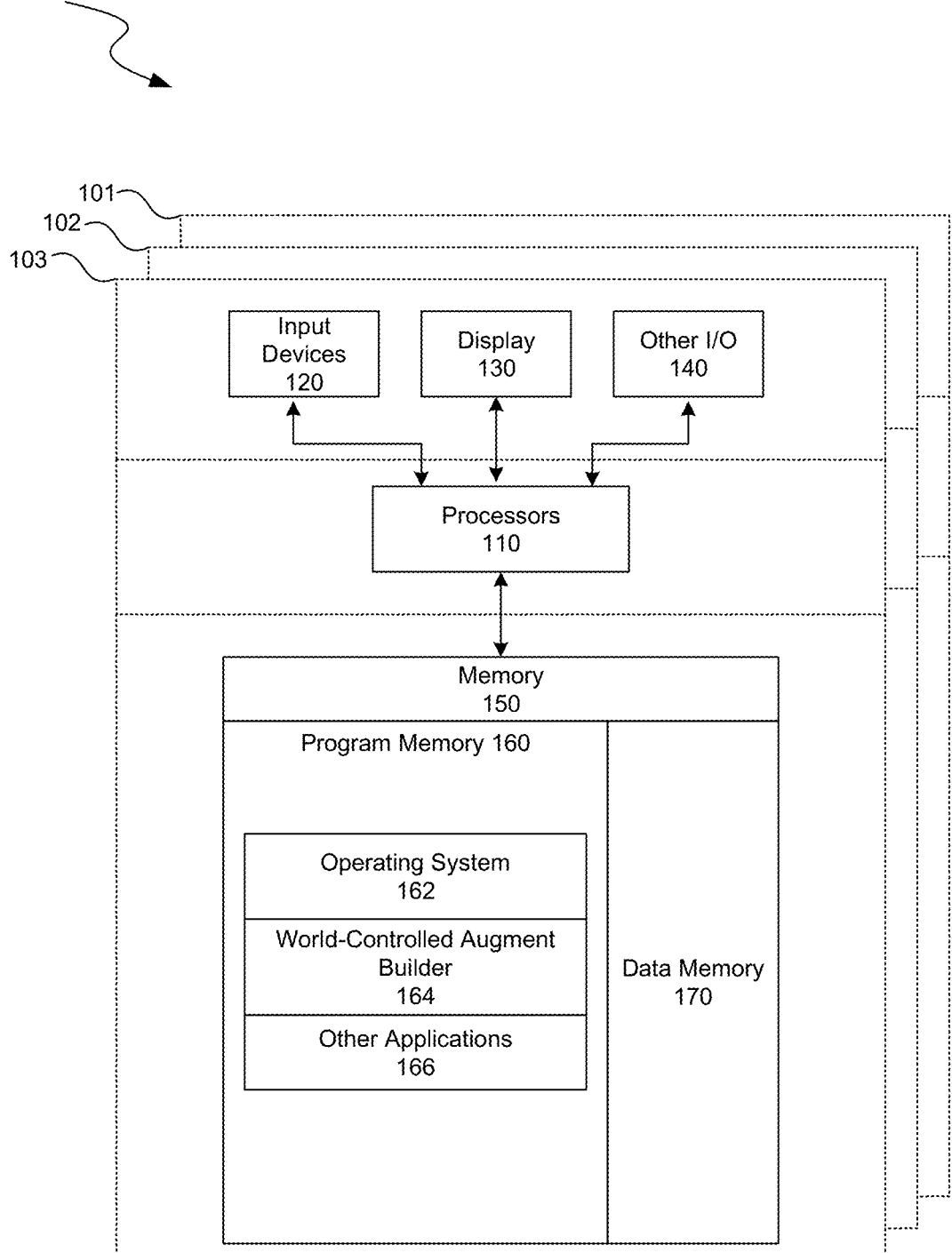
FIG. 1 is a block diagram illustrating an overview of devices on which some implementations of the present technology can operate.

To avoid limiting either augment capabilities or the set of potential developers, the present disclosure provides a system that supports two core types of augments: world-controlled augments and application-controlled augments. World-controlled augments can be controlled directly by an XR shell in the artificial reality environment, while application-controlled augments can be controlled by their hosting application. When a running application is halted, the application closes its application-controlled augments but can choose to have the XR system run a "place-holder" world-controlled augment. The place-holder world-controlled augment preserves the appearance of the application in the artificial reality environment but uses very few system resources. Upon a user selecting a place-holder world-controlled augment, the XR system can run the associated application and close the place-holder world-controlled augment.

The XR shell, or just "shell," can be an artificial reality device operating system or another application in control of an artificial reality environment. The shell can create content in the artificial reality environment. The shell can define the rules for how applications and virtual objects (i.e., augments) get access to hardware and artificial reality environment resources, what they have to do to create new virtual objects, how application and virtual objects share information, and can coordinate operation of the artificial reality environment. World-controlled augments require no application installation and are run directly by the XR shell. The XR shell is in direct control of resource use by world-controlled augments, so the XR shell can choose to run many of them at once. World-controlled augments persist as long as the XR shell keeps them running or until a user closes them.

Augments can be developed from within an XR system or on a traditional system (e.g., laptop or other flat panel system). To allow even inexperienced users to develop world-controlled augments, a world-controlled builder system is provided. Users invoke the world-controlled augment builder system to quickly develop world-controlled augments from provided templates. A user, guided by the world-controlled augment builder system, fills values into the fields of the templates. These templates limit a world-controlled augment's range of capabilities (e.g., do not include augments that require hand tracking, have no access to permissioned resources, etc.), but they also ensure consistency and allow on-the-fly creation within the artificial reality environment.

In contrast to world-controlled augments, application-controlled augments are limited only by the level of expertise of their developers and by the resources available on their host system. Application-controlled augments may be resource intensive (e.g., use eye-tracking, social-media tie-ins, hand-tracking, AI support, etc.), may support complicated interactions among themselves, and may make extensive use of inputs permissioned resources. Application-controlled augments disappear when the application controlling them halts. To prevent over-commitment of limited resources, the XR shell can allow only one or a few active applications at one time, with their corresponding application-controlled augments.

As an example of place-holding, a checkers-playing application can present a fully interactive application-controlled augment that presents the current status of the game, allows a user to make her next move with hand tracking, responds with a move received through a communication channel with a remote player, and the like. If the user selects another application to activate or leaves the proximity of the checkers-playing application-controlled augment for at least a threshold amount of time, then the checkers-playing application is shut down along with its application-controlled checkers augment. That augment is replaced by a place-holder world-controlled augment, run directly by the XR shell, that may for example, simply show the checkers board. If a user interacts with this place-holder augment, then the XR shell can replace it by running the checkers application again which, in turn runs its interactive checkers-playing application-controlled augment.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Existing XR systems do not support the simultaneous use of many sophisticated virtual objects. In addition, only the most experienced developers can create fully capable virtual objects with features such as communications to third parties, use of hand and eye tracking, AI assistant capabilities, etc. The world-controlled augment builder system and methods disclosed herein are expected to overcome these deficiencies in existing systems. The present disclosure provides a template-based augment builder by means of which even by the most inexperienced users can readily create world-controlled augments. Application-controlled augments, with a more extensive full range of capabilities, are also supported and can be created by more knowledgeable developers. The two types of augments can interact in beneficial ways. A world-controlled place-holder augment can preserve the appearance of an application in the artificial reality environment for as long as that application is not running, even while consuming very few system resources. Upon a user selecting a place-holder world-controlled augment, the XR system can run the associated application and close the place-holder world-controlled augment. By allowing both types of augments to work together, the present technology avoids limiting either augment capabilities or the set of potential developers. By allowing a place-holder world-controlled augment to preserve the appearance of an application, the present technology allows for an enriched artificial reality environment even in the face of limited resources, and thus enhances the value of the systems running the artificial reality environment.

Several implementations are discussed below in more detail in reference to the figures. FIG. 1 is a block diagram illustrating an overview of devices on which some implementations of the disclosed technology can operate. The devices can comprise hardware components of a computing system 100 that can control virtual objects. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, a world-controlled augment builder 164, and other application programs 166. Memory 150 can also include data memory 170 that can include, e.g., a library of world-controlled augments, templates for creating world-controlled augments, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
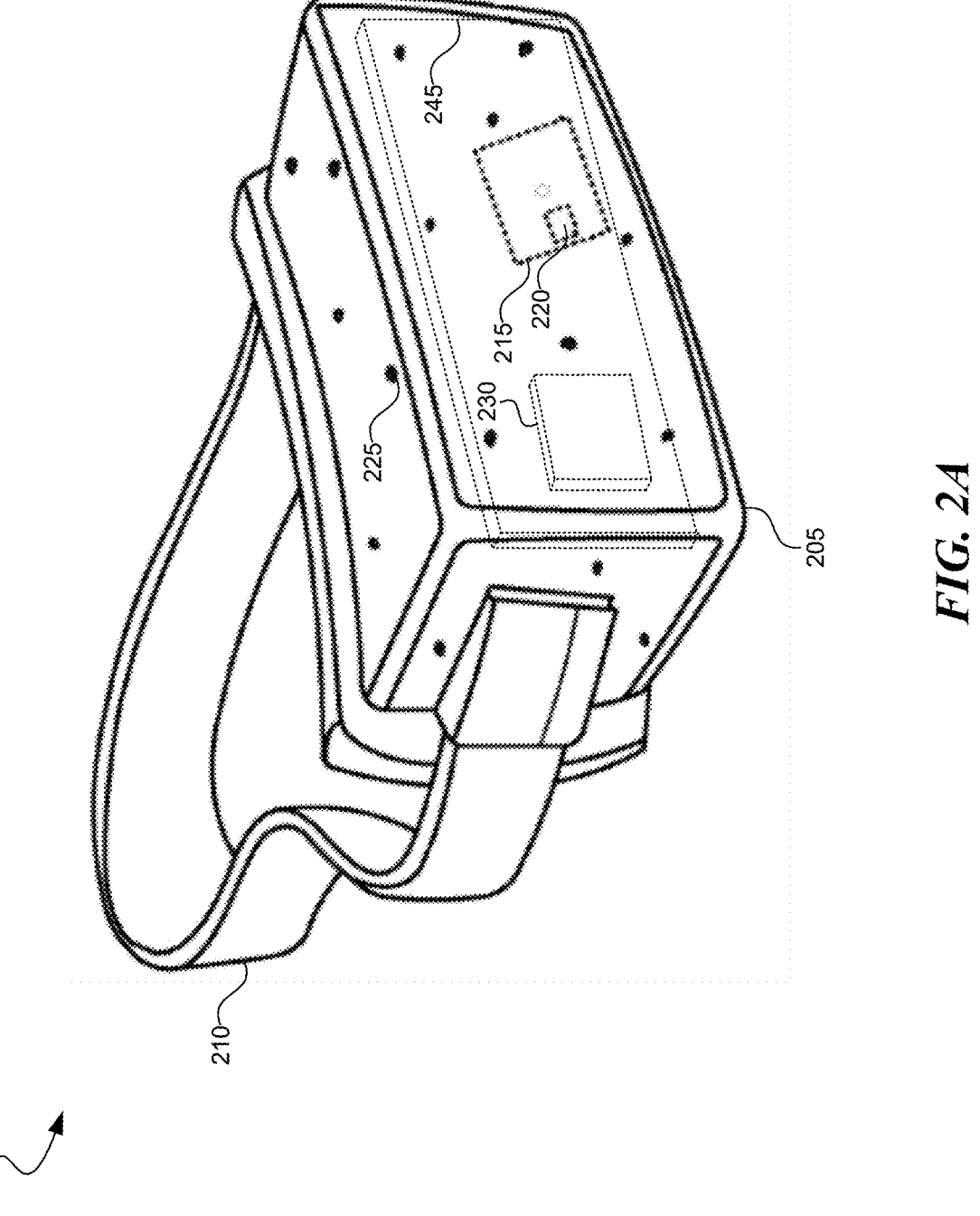
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3 DoF) or six degrees of freedom (6 DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200

(e.g., via light emitted from the HMD 200) which the PC can use, in combination with output from the IMU 215 and position sensors 220, to determine the location and movement of the HMD 200.

Figure 2B:
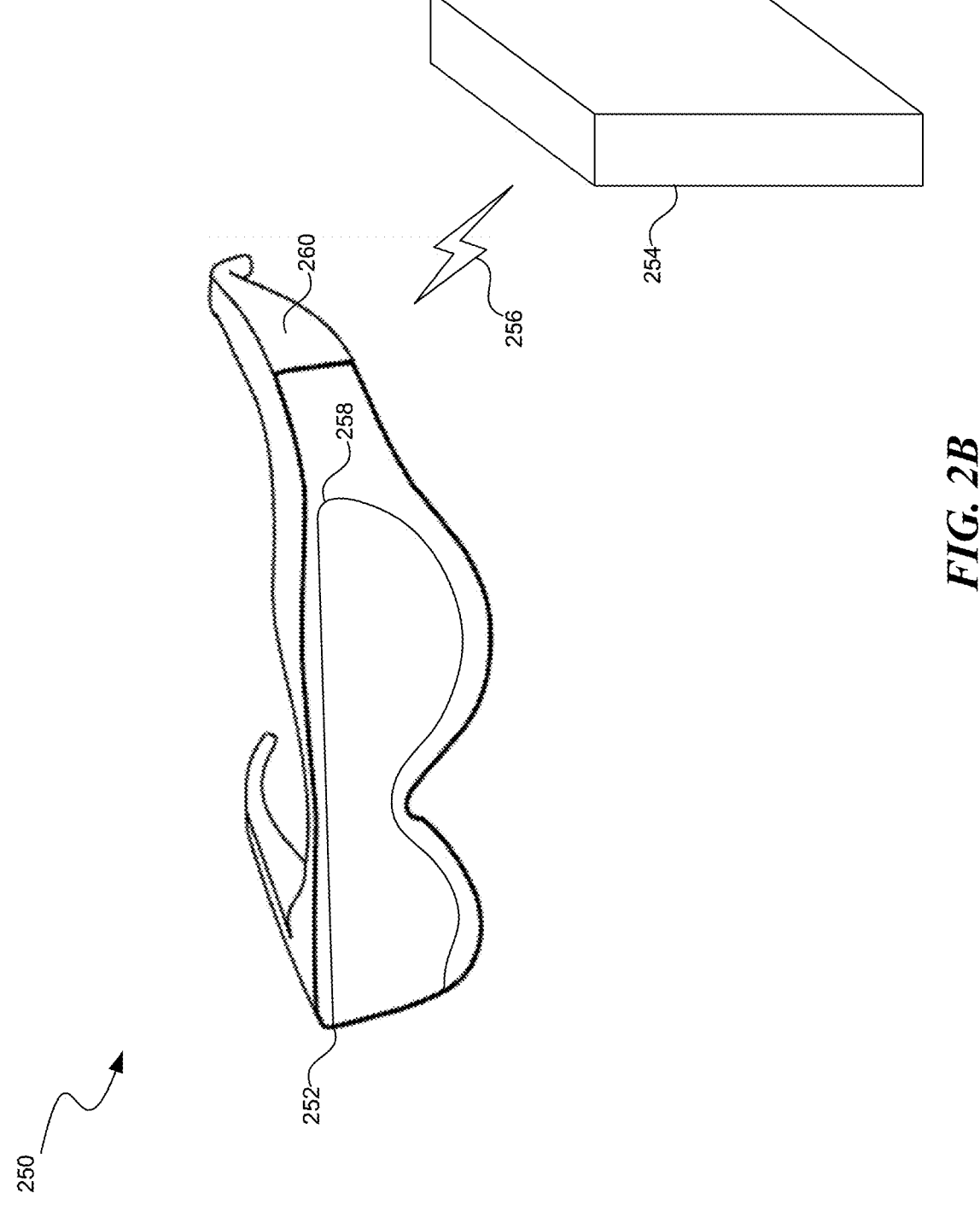
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3 DoF or 6 DoF, track portions of the user (e.g., hands, feet, head, or other body parts), map virtual objects to appear as stationary as the HMD 252 moves, and have virtual objects react to gestures and other real-world objects.

Figure 2C:
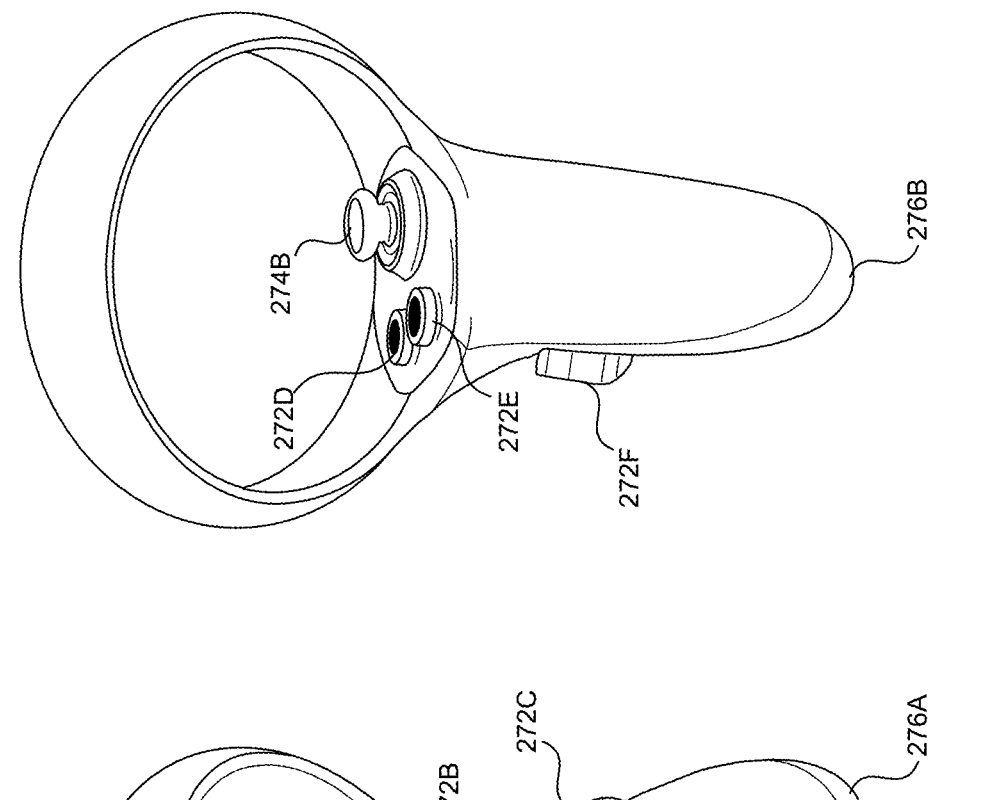
FIG. 2C is a wire diagram illustrating controllers which, in some implementations, a user can hold in one or both hands to interact with an artificial reality environment.
Figure 2C:
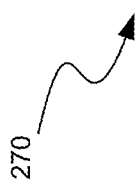

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3 DoF or 6 DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
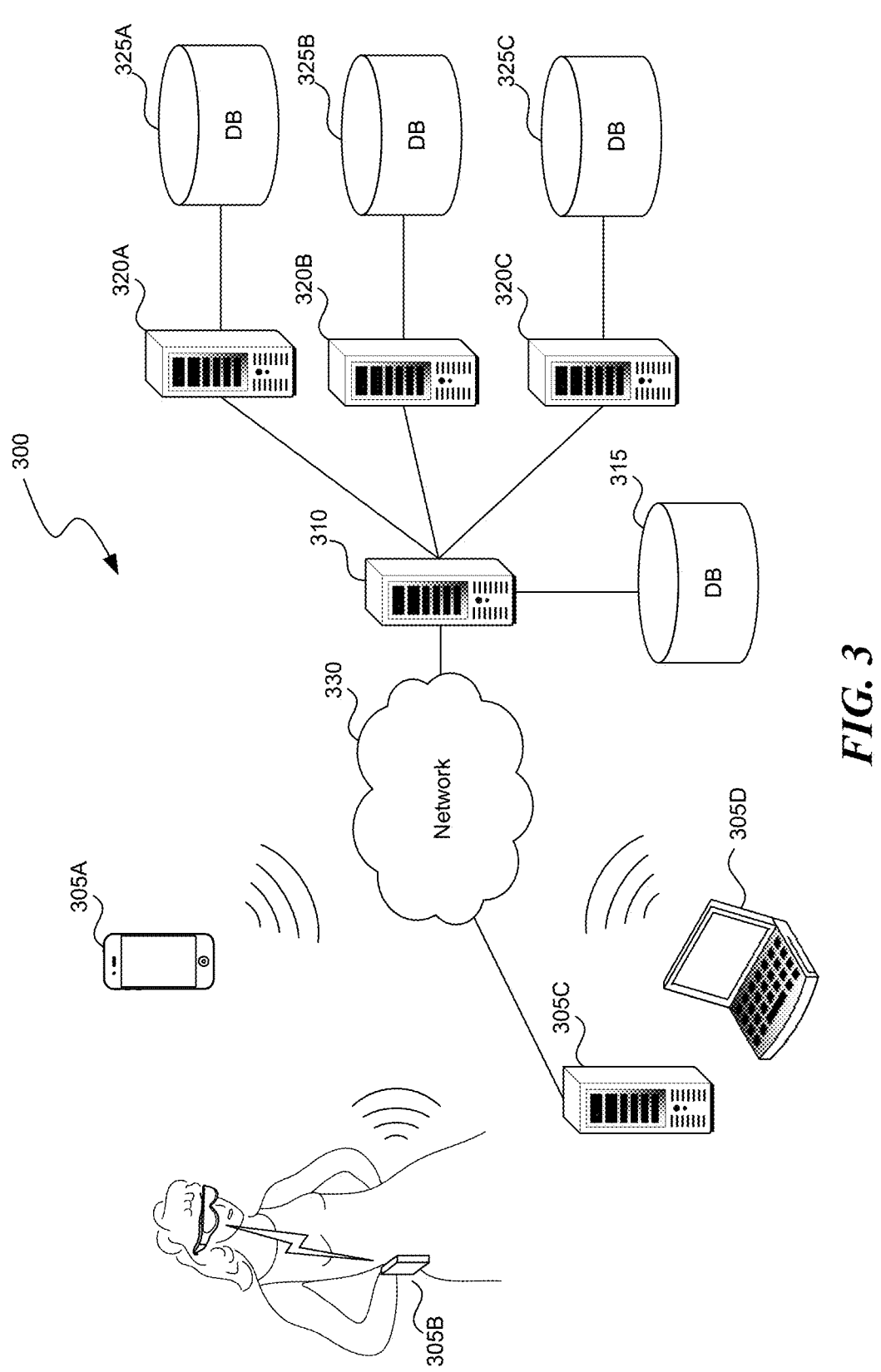
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
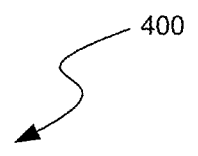
FIG. 4 is a block diagram illustrating components which, in some implementations, can be used in a system employing the disclosed technology.
Figure 4:
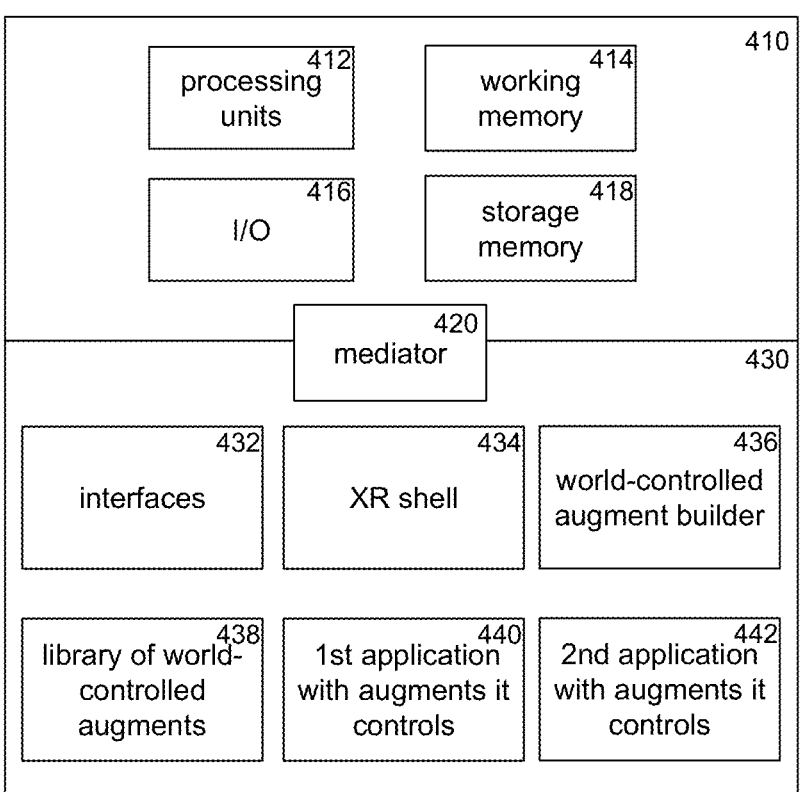

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for supporting world-controlled and application-controlled augments. Specialized components 430 can include an XR shell 434, a world-controlled augment builder 436, a library of world-controlled augments 438, one or more applications with their associated application-controlled augments 440 and 442, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

The XR shell 434 can be an application that presents an artificial reality environment to users and can coordinate the user's interactions with the artificial reality environment. The XR shell 434 can coordinate the work of XR subcomponents, such as the applications 440 and 442 and can control interactions between augments. The XR shell 434 can be responsible for running world-controlled augments.

Users can invoke the world-controlled augment builder 436 to build their augments. The world-controlled augment builder 436 can present to the user templates. The user, guided by the world-controlled augment builder 436, can select a template and fill values into the fields of the selected template. Through its use of templates, the world-controlled augment builder can limit a world-controlled augment's range of capabilities and can ensure consistency among world-controlled augments build by different users. In some variations, the world-controlled augment builder 436 can allow the user to create augments "on-the-fly" while within the artificial reality environment. In other cases, the world-controlled augment builder 436 can be used through an alternate system, such as a traditional computer, allowing the user to create augments for future use in an artificial reality environment.

Because the XR shell 434 can directly run all world-controlled augments, it can have access to them. The library of world-controlled augments 438 can be the repository of these world-controlled augments the XR shell 434 can run. In some cases, world augments can live in the cloud and be serviced to an end point device depending on its context, such as geolocation, user profile/preferences, system or user state, recent actions, etc.

Applications 440 and 442 represent any number of applications that may run, at one time or another, in the user's artificial reality environment. Each application can be associated with one or more application-controlled augments.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
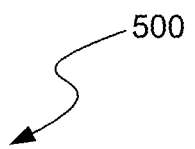
FIG. 5 is a flow diagram illustrating a process used in some implementations of the present technology for creating a world-controlled augment.
Figure 5:
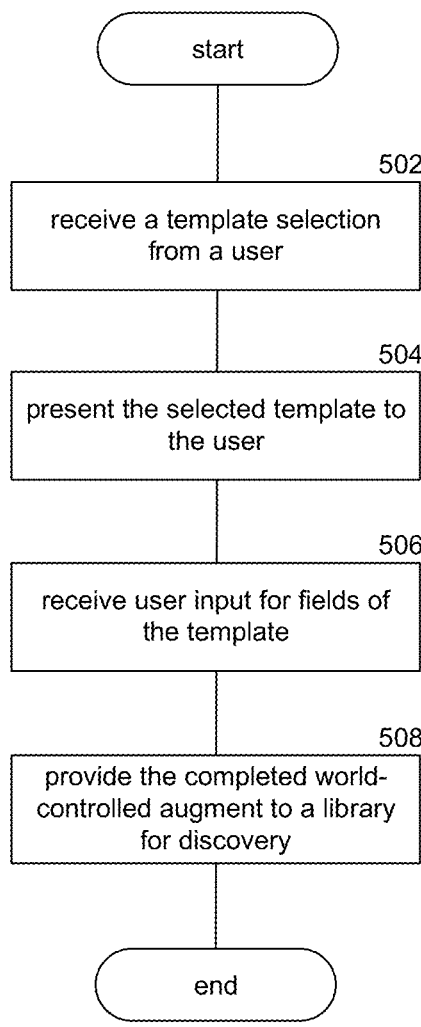
Figure 6:
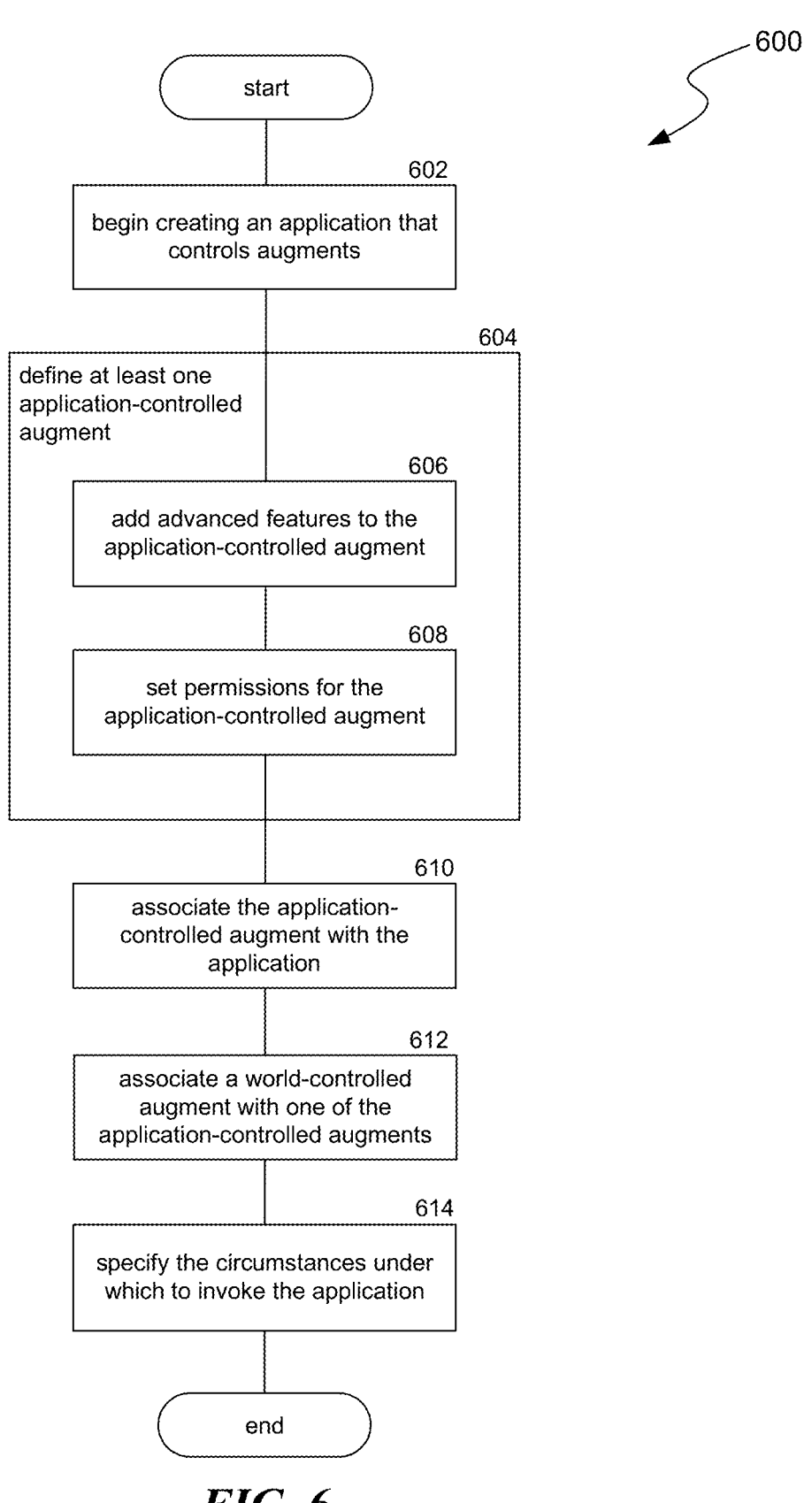
FIG. 6 is a flow diagram illustrating a process used in some implementations of the present technology for creating an application and its application-controlled augments.
Figure 7:
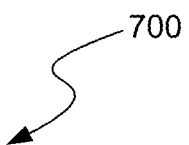
FIG. 7 is a flow diagram illustrating a process used in some implementations of the present technology for running one or more applications and world-controlled augments in an artificial reality environment.
Figure 7:
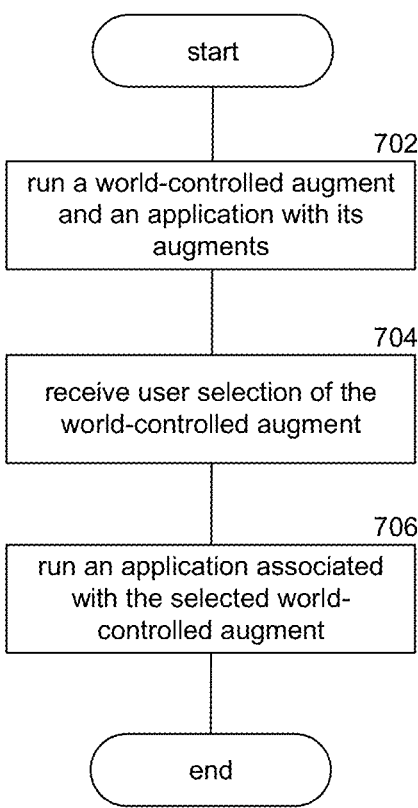
Figure 8:
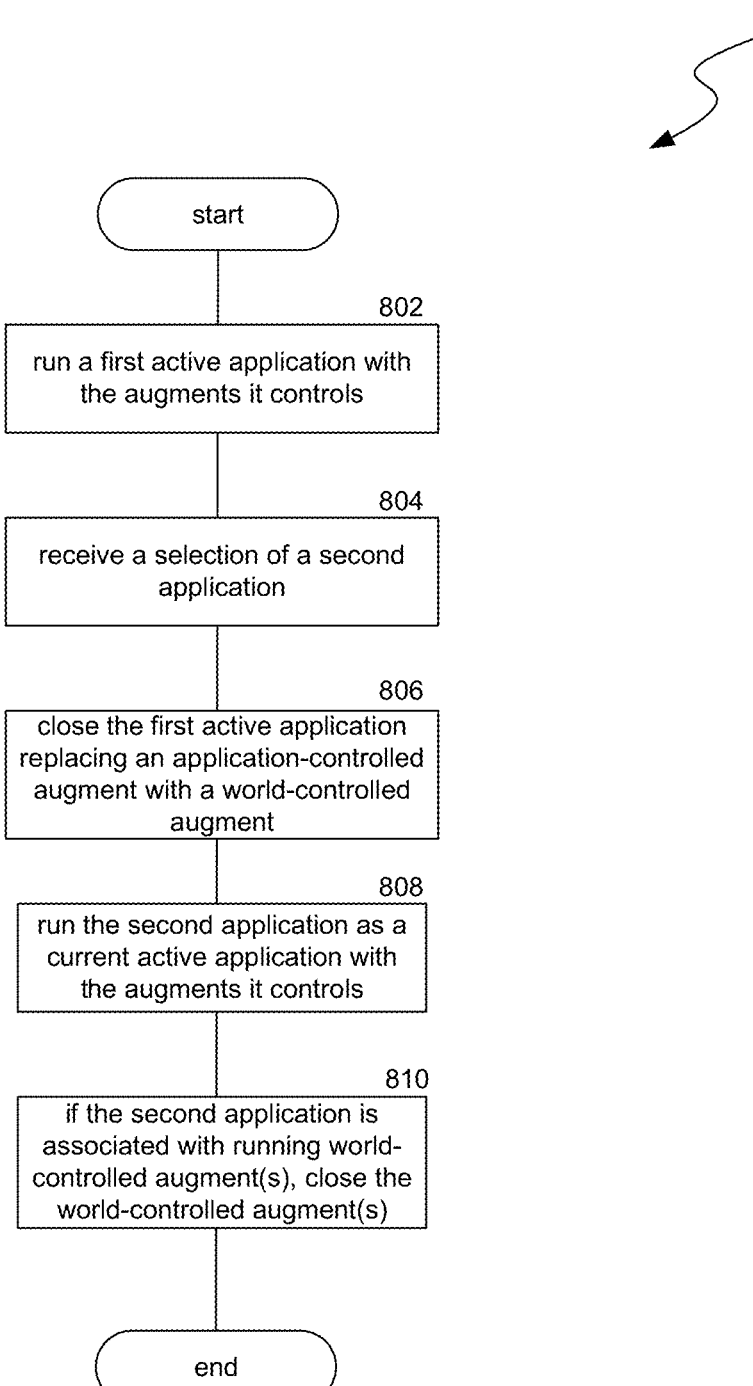
FIG. 8 is a flow diagram illustrating a process used in some implementations of the present technology for switching from running one application with the augments it controls to another application.

The differences between the capabilities of world-controlled augments and application-controlled augments are reflected in their different creation processes. FIGS. 5 and 6 depict these creation processes, while FIGS. 7 and 8 depict the differing modes of operation of these augments and how they can interact.

FIG. 5 is a flow diagram illustrating a process 500 used in some implementations for creating a world-controlled augment. In some variations, process 500 is invoked by a user (e.g., process 500 can runs on the user's personal computer) when the user is outside of the artificial reality environment. In some variations, process 500 begins when a user in the artificial reality environment interacts with a world-controlled augment builder associated with the creation of world-controlled augments. The user's interaction can include looking at, pointing at, or touching a representation of the world-controlled augment builder (e.g., from an application launcher). In some variations, process 500 can begin when the user verbally expresses a command to create a world-controlled augment, and that expression is mapped into a semantic space (e.g., by applying a natural-language processing model) to determine the user's intent from the words of the command.

At block 502, process 500 receives a user's selection of a template appropriate to the world-controlled augment he wishes to create. In some variations, the user's selection is from a menu of templates presented to the user by the world-controlled augment builder 436. These templates can be presented to the user with some fields already filled in with default values, for example, for values, permissions, actions, etc. In some variations, the "template" is an already-created world-controlled augment whose features the user's new world-controlled augment may copy or inherit.

At block 504, process 500 presents the selected template to the user with, in some variations, tips on how to populate the fields of the template.

At block 506, process 500 interacts with the user to populate the template for the new world-controlled augment. This can include filling in fields for values, permissions, actions, etc. Some value fields can be metadata such as a name for the world-controlled augment, the augment's author or owner, and a unique identifier for the world-controlled augment. Other value fields can include the world-controlled augment's visual elements including images and 3D models, parameters, and links to external data sources (such as time of day, a news feed).

The user can, with the aid of the templates, define actions allowed to this type of world-controlled augment and can define permissions associated with those actions. Actions define how the world-controlled augment interacts with users and with the artificial reality environment in general. Types of action can include object behaviors, spatial behaviors, data-management interactions, notification actions, privacy actions, system actions, etc. Object behaviors can include how the world-controlled augment reacts to other objects in the artificial reality environment, inputs, and events, and can specify triggers for the world-controlled augment to make responsive display, configuration, or other output actions. Spatial behaviors can include how the world-controlled augment moves, reacts to surface placement, sets view states in different contexts, etc. Other actions can define how the world-controlled augment responds to changing situations including data-management interactions (e.g., what data the world-controlled augment retrieves or updates in response to given triggers), notifications (e.g., how the world-controlled augment surfaces detected events in the artificial reality environment), privacy and security actions (e.g., what data and interfaces the world-controlled augment makes available to the user, other virtual objects, and other entities and how the world-controlled augment protects its internal resources), and/or system actions (e.g., changing states for power management, managing and requesting resources, hardware access, interfacing with the OS or other controlling application, thread execution management, etc.).

In some variations, the user can define how the world-controlled augment responds to user input, in some cases via a user interface defining touch, voice, and other interactions.

The user can specify permissions for the new world-controlled augment including, for example, the volume in the user's artificial reality environment into which the world-controlled augment is authorized to write. In some variations, the world-controlled augment may be defined with multiple view states and contextual breakpoint rules for transitioning among them. Each view state can control what and how the world-controlled augment presents its data and what the virtual object can use as an anchor point while in that state. Other permissions can be associated with the other action types listed above and with their associated data.

While the scope of data, data types, and data sources possibly associated with a world-controlled augment is effectively unlimited, specific templates can require specific fields. For example, a world-controlled augment representing a character in the artificial reality environment may require a name, current status, and an avatar.

As mentioned above, the template may include default values for some or all of the object's parameters and values. In some cases, the "template" is an existing world-controlled augment from which the augment being created copies or inherits values, actions, parameters, etc. The user can, generally speaking, add to the inherited components, remove them, or replace them with user-specified alternatives. In some cases, the "parent" augment can specify which of these inheritances may be overwritten by the user's choice. In the same manner, the user can be given permission to change some defaults included with a template.

As discussed above, the capabilities added to the world-controlled augment in block 506 can be limited by the template. In some variations, for example, the world-controlled augment is prevented from accessing any permissioned resources (e.g., camera, messaging service) and is prevented from using very much computing power.

Throughout block 506, process 500 may guide the user in populating the template, thus easing the creation of the new world-controlled augment while the template also limits what actions that augment can perform.

Figure 9:
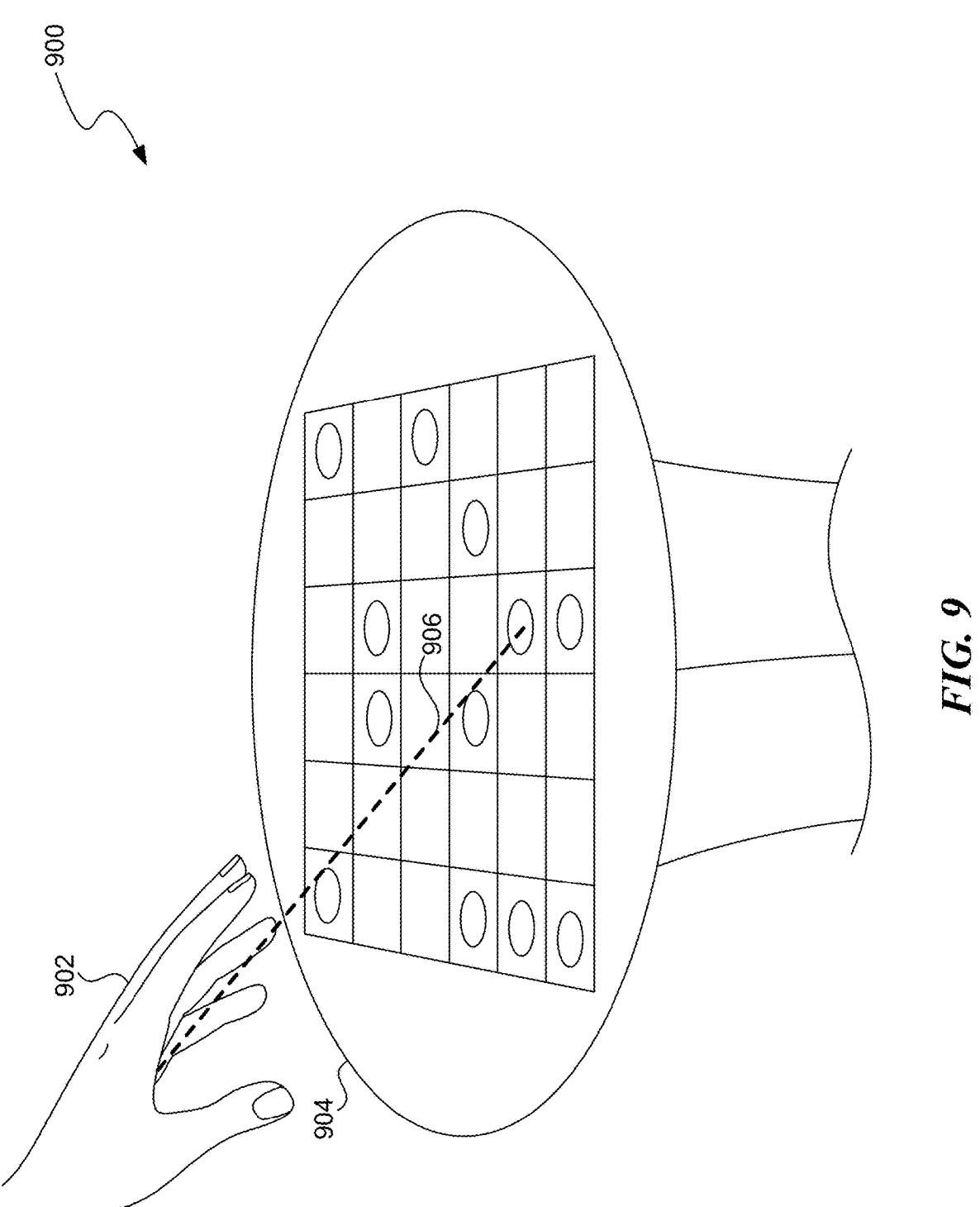
FIG. 9 is a conceptual diagram illustrating an example of an application-controlled augment.
Figure 10:
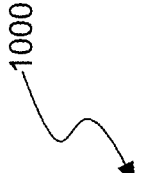
FIG. 10 is a conceptual diagram illustrating an example of a world-controlled augment preserving the place of an application not currently running in an artificial reality environment.
Figure 10:
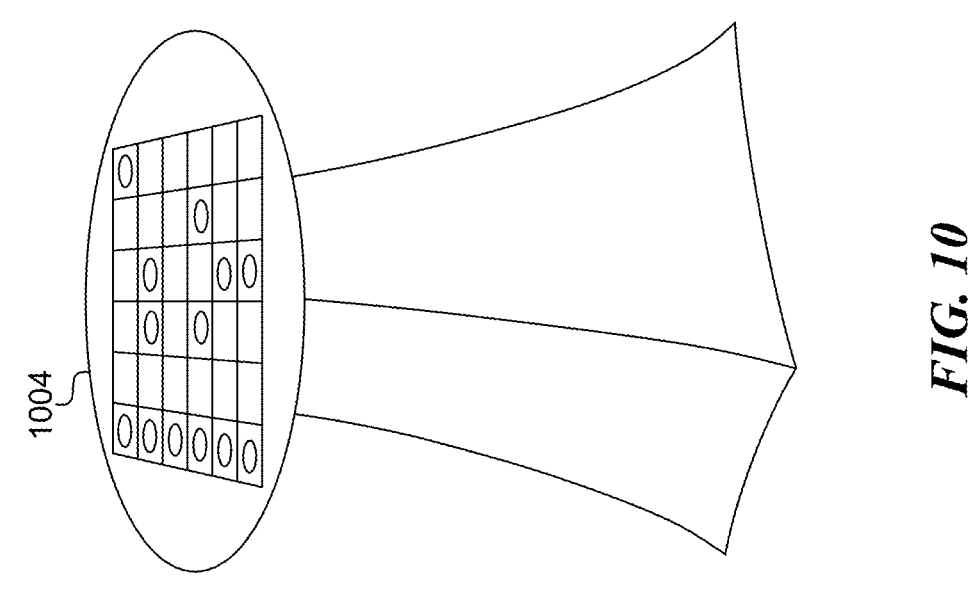
Figure 10:
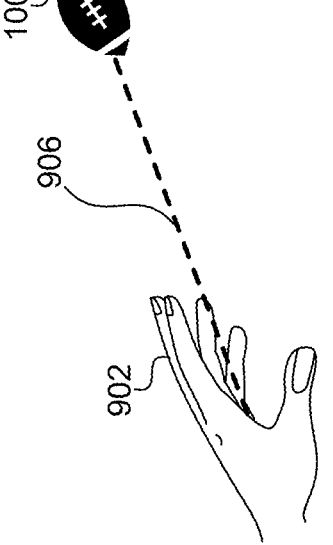

At block 508, process 500 can add the newly created world-controlled augment to a library 438 from which it can be drawn later as needed. In some variations, the newly created world-controlled augment can be associated with an application to serve as a place-holder augment when the application is not running. Step 806 of FIG. 8 and FIGS. 9 and 10 illustrate this scenario. In some variations, the newly created world-controlled augment is triggered for automatic display in the user's artificial reality environment in certain contexts. In some cases, the augment to a library is on a remote system, providing world-controlled augments for users other than the user who created them.

Compare the above description of the templated creation of a world-controlled augment with FIG. 6's description of the creation of an application and its application-controlled augments, as used in some implementations. Similarly to the process 500 described above, in some variations, the process 600 of FIG. 6 can begin when a user, outside of the artificial reality environment (e.g., process 600 runs on the user's personal computer or on a remote server), begins to create a new application that will control its own augments. In this case, a developer uses the process 600 to create an application along with its augments and later imports that application into an artificial reality environment. In other cases, the developer can use an application creation system from within the artificial reality environment to create the application and its corresponding application-controlled augments.

At block 602, the process 600 begins the creation of the new application, e.g., in an artificial reality environment or traditional computer application development system. While, like the creation of world-controlled augments (see FIG. 5 and accompanying text), the creation process 600 for an application with its augments can use templates, it can also include defining and controlling augments with a much wider range of properties and abilities. The application developer has much more flexibility in how to create the application and what capabilities and permissions to assign to the new application (see especially the following description of blocks 606 and 608).

At block 604, process 600, in some variations, defines at least one application-controlled augment that will be controlled by the developing application. As when developing the application itself, the developer has a great deal of freedom in how to develop an application-controlled augment. In some variations, the application developer can choose to begin the creation process with templates from the world-controlled augment builder 436 or can choose to begin with an existing augment as a jumping-off place.

Any of the world-controlled augment's capabilities and features discussed above in relation to block 506 of FIG. 5 can apply as well to an application-controlled augment. For example, while an application-controlled augment can have any number and type of data elements, an example application-controlled augment can include metadata (e.g., a name for the application-controlled augment, the augment's author or owner, and a unique identifier for the application-controlled augment), visual elements including images and 3D models, parameters, and links to external data sources (such as a messaging application, a gesture-tracker). The developer can define actions allowed to the application-controlled augment and can define permissions associated with those actions. Specific actions can include object behaviors, spatial behaviors, data-management interactions, notification actions, privacy actions, system actions, etc. In some variations, the developer can define how the application-controlled augment responds to user input, such as via a user interface defining gesture, touch, voice, and other interactions.

When developing an application-controlled augment, the developer is free to go beyond the limits imposed by the XR system on capabilities for world-controlled augments. The specifics of those limits can vary from system to system, but can include denial of permission to world-controlled augments to richly interact with other augments or with users and denial of the use of permissioned resources. Thus, the developer can at block 606 give the application-controlled augment advanced features with much greater capabilities. These features can include, for example, user gaze-tracking, hand tracking, complicated interaction modes with users and between augments controlled by this application, access to messaging or other network resources, access to AI assistants or other machine-learning powered systems, and, in general, whatever capabilities the XR system that will host the application provides. This is one area that distinguishes applications and their application-controlled augments from world-controlled augments. To keep them easy to create and low on computing resource requirements, world-controlled augments are not given access to these advanced features and/or are limited in what the world-controlled augments can do with various resources and inputs.

At block 608, process 600 sets permissions for the application and, by inheritance from the application, permissions for the application-controlled augments. In order to implement many of the advanced features added in block 606, the application must secure permission to access certain system resources such as a camera, a microphone, profile information about an interacting user, and the like. Once those permissions are granted to the application, the application can in turn extend those same permissions, or a strict subset of them, to its application-controlled augments. The use of inheritance of permissions, like the use of inheritance of field definitions, allows the application-controlled augment to present to the user a unified experience. This is an area that distinguishes applications and their application-controlled augments from world-controlled augments. Applications may be given much a much broader range of permissions than world-controlled augments can have.

At block 610, process 600 associates the newly create application-controlled augment with the developing application. At block 612, process 600 associates at least one world-controlled augment with at least one of the new application's application-controlled augments. The creation of this world-controlled augment can be templated as described above in relation to FIG. 5. In some implementations, the creation of the world-controlled augment can be automatic based on the newly create application-controlled augment, taking features such as the 3D models and display properties from the newly create application-controlled augment, but not including the advanced features only available to application-controlled augments. This world-controlled augment can be used to represent the application-controlled augment when the application under development has invoked the application-controlled augment, but then has been closed or replaced with another active application (so it can no longer present its application-controlled augments). Additional aspects of the working of the association between an application-controlled augment and a world-controlled augment are described below in reference to the flows of FIG. 8 and to the conceptual scenario of FIGS. 9 and 10.

At block 614, process 600 specifies the circumstances under which the application can run. For examples of this, see the flows of FIGS. 7 and 8 and the conceptual scenario of FIGS. 9 and 10.

FIG. 7 is a flow diagram illustrating a process 700 used in some implementations for running one or more applications and world-controlled augments in an artificial reality environment. The world-controlled augments may have been created through process 500 of FIG. 5, and the applications with their application-controlled augments may have been created through process 600 of FIG. 6. Process 700 can be run as part of the XR system and may begin when a user first enters the artificial reality environment by, for example, donning an HMD 200 or executing a specific environment with the HMD 200.

At block 702, process 700 runs one or more world-controlled augments that are relevant to the user's current location. For example, process 700 can identify anchor points in the current environment and select world-controlled augments that match those anchor points and/or can identify various contextual factors such as who the user is, what other objects are in the area, time, date, other people around, etc. and perform an analysis on available world-controlled augments to rank them according to which best match the contextual factors. Process 700 can use perform these checks in regard to world-controlled augments in a local and/or cloud based version of the library 438 and can display the chosen or highest ranking world-controlled augments. This set of displayed world-controlled augments can change as the user changes context, location, and/or orientation.

Process 700 can execute one or more applications (i.e., one or more current active applications) along with its associated application-controlled augments. The application chosen to run can be a system default, may depend upon the user's situation when entering the artificial reality environment, or may be based on a user selection. For example, a user may open a launcher which lists available applications and can select one to be a current active application. As another example, a user may select a world-controlled augment in the environment which may be associated with an application and cause that application to execute as the current active application (as discussed in the next block).

At block 704, process 700 receives the user's selection of a world-controlled augment. In some variations, the user interacts with a world-controlled augment that is associated with an application, and the world-controlled augment is acting as a place-holder when the application is not running. (In some cases, not all world-controlled augments are place-holders for application-controlled augments of stopped applications.) The user's interaction can include, for example, looking at, pointing at, touching, or indicating with a voice command, the world-controlled augment. In some variations, the user verbally expresses a command to select an application or its associated world-controlled augment, and that expression is mapped into a semantic space (e.g., by applying an NLP model) to determine the user's intent from the words of the command.

At block 706, process 700 can shut down an executing active application (e.g., executed at block 702 or previously executed) and can begin to run the application selected by the user in block 704. The newly selected application can begin to run one or more of its application-controlled augments. See FIG. 8 and the accompanying text for details about what can happen when one application replaces another.

FIG. 8 is a flow diagram illustrating a process 800 used in some implementations for switching from running one application with the augments it controls to another application. Process 800 runs in the XR system and may begin as soon as a user first enters the artificial reality environment by, for example, donning an HMD 200. Process 800 can be a more detailed implementation of process 700 or may be a sub-process of process 700 of FIG. 7.

At block 802, process 800 runs a first application that comes with its application-controlled augments. Unlike the case for the world-controlled augments which is run directly by the XR shell, application-controlled augments are under the control of their hosting application. That application can decide the circumstances under which each of the augments it controls will run and the circumstances under which each stops running. When the application itself stops running, all of its application-controlled augments also stop running, but may be replaced with world-controlled augments as discussed below.

At block 804, a user selects a second application to run. There are numerous ways in which the selection can be made. For instance, blocks 704 and 706 of FIG. 7 illustrate the case when the user selects a world-controlled augment that is a place-holder associated with a non-running application. The user can also select an application to run using words or gestures, through a launcher selection, or the XR system may receive another trigger from the user or another source (such as a network signal indicating an incoming message or notification) to launch a different active application.

At block 806, process 800 triggers the already running active application to shut down. This happens because each application may consume significant resources and the XR system can simultaneously run only one or a limited number at a time. In this scenario, the XR system cannot afford to start running the user-selected second application while leaving the first application running. Closing the active application can include saving a state of the active application, including one or more of the application-controlled augments. This state allows the application to re-run itself and its application-controlled application from the same point the next time the application executes.

Note that while in the scenario of block 806, it is the user's selection of the second application that causes the first application to shut down, in other scenarios the first application shuts down for other reasons. For example, the system may be running out of resources and may shut down the first application as an "emergency" measure. In another example, the user chooses to shut down the first application but does not yet wish for another application to be run. In all these cases, the process of block 806 can be followed.

When the first active application stops running, all of its application-controlled augments will cease to run. In the scenario of block 806, the first active application prepares for this by causing one or more of its application-controlled augments to be replaced with a place-holder world-controlled augment. The place-holder world-controlled augment is run by the XR shell in response to a request from the first active application or is passed off to the XR shell. The place-holder world-controlled augment from the first application is then run directly by the XR shell, allowing it to remain after the active application has closed. The first active application is then halted, and all of its application-controlled augments are closed.

At block 808, the selected second application is run. As with the first application while it was running, during its lifetime the second application may run application-controlled augments, which may include providing an application-controlled augment in lieu of any world-controlled augments that were placeholders for that application's application-controlled augments (e.g., an augment that was selected to cause the new active application to execute).

If the user chooses to switch back to the first application, that choice can be implemented by choosing the place-holder world-controlled augment initiated in block 806 (effectively re-executing process 800).

At block 810, if the user selected the second application by means of a place-holder world-controlled augment set up expressly for that purpose or there were other placeholder world-control augments for the active application that have been replaced with application-controlled augments, then the place-holder world-controlled augments have served their purpose, and process 800 can stop running them.

FIGS. 9 and 10 are conceptual drawings 900 and 1000 that illustrate some of the concepts discussed above, in particular those discussed in relation to block 806 of FIG. 8. In FIG. 9, a user 902 is playing checkers by interacting with an application-controlled augment 904. The board application-controlled augment 904 has a host application that updates the board as the game progresses and handles communications with the user 902's opponent or is the opponent itself. The application also uses system resources such as a tracking camera to determine how to create the control ray 906 from the user 902's hand to the application-controlled augment 904.

Eventually the user 902 leaves the game and selects another active application by selecting a corresponding world-controlled augment 1002 (causing the corresponding application to execute). Rather than needlessly continuing to consume precious system resources, the host application for the checkers game saves its state (e.g., the status of the game) and is shut down. As part of its shut-down process, the host application presents the place-holder world-controlled augment 1004 of FIG. 10 for the XR shell to run in place of the application-controlled augment 904. The host application for the checkers game then stops running, along and the checkers application-controlled augment 904. However, this is not evident to the user as the place-holder world-controlled augment 1004 is still present. Yet, place-holder world-controlled augment 1004 cannot play checkers, but its visual presence that indicates that checkers playing is possible. If a user interacts with the place-holder world-controlled augment 1004 by, say, touching it, the XR shell stops running the place-holder world-controlled augment 1004 and re-starts the host application which then starts up the application-controlled augment 904, using its previously saved state to continue the game from the same point.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A computer-implemented method for displaying augments in an artificial reality system, the method comprising:
running an application on an artificial reality system, wherein the application controls an application-specific augment;
generating a placeholder augment that is associated with the application-specific augment but uses less of the artificial reality system's resources than the application-specific augment, wherein the placeholder augment is controlled by a shell other than the application;
stopping execution of the application and ceasing to provide the application-specific augment;
responsive to stopping execution of the application, providing, by the shell, the placeholder augment in an artificial reality environment of the artificial reality system;
receiving a selection of the placeholder augment; and
responsive to receiving the selection of the placeholder augment, (i) executing the application and (ii) providing, by the application, the application-specific augment in the artificial reality environment of the artificial reality system.

2. The computer-implemented method of claim 1, wherein the shell controls which of the artificial reality system's resources are available to the application.

3. The computer-implemented method of claim 1, further comprising, responsive to the executing the application, removing the placeholder augment from the artificial reality environment.

4. The computer-implemented method of claim 1, wherein the stopping execution of the application and the ceasing to provide the application-specific augment is responsive to one or more of:
a selection of another application; or
a shortage of resources in the shell.

5. The computer-implemented method of claim 1, wherein the providing the application-specific augment comprises applying a state to the application-specific augment, wherein the state is saved from a previous execution of the application.

6. The computer-implemented method of claim 1, wherein the generating the placeholder augment is based on an augment template customized by the application.

7. The computer-implemented method of claim 1, wherein the shell controls interactions between the application and one or more other applications installed on the artificial reality system.

8. A computer-readable storage medium storing instructions that, when executed by a computing system, cause the computing system to perform a process for displaying augments in an artificial reality system, the process comprising:
running an application on an artificial reality system, wherein the application controls an application-specific augment;
generating a placeholder augment that is associated with the application-specific augment but uses less of the artificial reality system's resources than the application-specific augment, wherein the placeholder augment is controlled by a shell other than the application;
stopping execution of the application and ceasing to provide the application-specific augment;
responsive to stopping execution of the application, providing, by the shell, the placeholder augment in an artificial reality environment of the artificial reality system;
receiving a selection of the placeholder augment; and
responsive to receiving the selection of the placeholder augment, (i) executing the application and (ii) providing, by the application, the application-specific augment in the artificial reality environment of the artificial reality system.

9. The computer-readable storage medium of claim 8, wherein the shell controls which of the artificial reality system's resources are available to the application.

10. The computer-readable storage medium of claim 8, wherein the process further comprises, responsive to the executing the application, removing the placeholder augment from the artificial reality environment.

11. The computer-readable storage medium of claim 8, wherein the stopping execution of the application and the ceasing to provide the application-specific augment is responsive to one or more of:
a selection of another application; or
a shortage of resources in the shell.

12. The computer-readable storage medium of claim 8, wherein the providing the application-specific augment comprises applying a state to the application-specific augment, wherein the state is saved from a previous execution of the application.

13. The computer-readable storage medium of claim 8, wherein the generating the placeholder augment is based on an augment template customized by the application.

14. The computer-readable storage medium of claim 8, wherein the selection of the placeholder augment comprises a user interaction with the placeholder augment.

15. A computing system for displaying augments by an artificial reality system, computing system comprising:

one or more processors; and one or more memories storing instructions that, when executed by the one or more processors, cause the computing system to perform a process comprising:

running an application on an artificial reality system, wherein the application controls a first an application-specific augment;

generating a placeholder augment that is associated with the application-specific augment but uses less of the artificial reality system's resources than the application-specific augment, wherein the placeholder augment is controlled by a shell other than the application;

stopping execution of the application and ceasing to provide the application-specific augment;

responsive to stopping execution of the application, providing, by the shell, the placeholder augment in an artificial reality environment of the artificial reality system;

receiving a selection of the placeholder augment; and responsive to receiving the selection of the placeholder augment, (i) executing the application and (ii) providing, by the application, the application-specific augment in the artificial reality environment of the artificial reality system.

16. The computing system of claim 15, wherein the shell controls which of the artificial reality system's resources are available to the application.

17. The computing system of claim 15, wherein the process further comprises, responsive to the executing the application, removing the placeholder augment from the artificial reality environment.

*    *    *    *    *